(12) United States Patent
Jung

(10) Patent No.: US 10,091,149 B2
(45) Date of Patent: Oct. 2, 2018

(54) SPOILER ALERT SCHEME

(71) Applicant: Empire Technology Development LLC, Wilmingtod, DE (US)

(72) Inventor: Yang-Won Jung, Seoul (KR)

(73) Assignee: Empire Technology Development LLC, Wilmington, DE (US)

(*) Notice: Subject to any disclaimer, the term of this patent is extended or adjusted under 35 U.S.C. 154(b) by 442 days.

(21) Appl. No.: 13/996,290

(22) PCT Filed: Jan. 28, 2013

(86) PCT No.: PCT/US2013/023454
§ 371 (c)(1),
(2) Date: Jun. 20, 2013

(87) PCT Pub. No.: WO2014/116261
PCT Pub. Date: Jul. 31, 2014

(65) Prior Publication Data
US 2014/0214980 A1    Jul. 31, 2014

(51) Int. Cl.
*H04L 12/58* (2006.01)
(52) U.S. Cl.
CPC .............. *H04L 51/12* (2013.01); *H04L 51/32* (2013.01)
(58) Field of Classification Search
CPC . H04L 12/1822; H04L 12/587; H04L 12/588; H04L 51/24; H04L 51/32; H04L 67/306; H04L 67/38; H04L 63/0428; H04L 63/08; H04L 63/06; H04L 2209/56; H04L 63/0807; H04L 63/0823; H04L 63/12; H04L 67/10; H04L 9/3215; H04L 9/3247; H04L 12/14; H04L 12/1403; H04L 12/1425; H04L 12/1859; H04L 41/0681; H04L 63/102; H04L 63/1416; H04L 65/1016; H04L 65/104; H04L 67/04; H04L 67/16; H04L 67/18; H04L 67/22; H04L 67/30; H04L 63/145; H04L 63/1408; H04L 67/24; H04L 67/34; H04L 12/185; H04L 12/1895; H04L 63/1425; H04L 67/2814; G06Q 10/109; G06Q 10/1093;
(Continued)

(56) References Cited

U.S. PATENT DOCUMENTS 7,284,033 B2 * 10/2007 Jhanji .................... G06Q 30/02
709/204
8,478,757 B2 *  7/2013 Leibu et al. .................. 707/736
(Continued)

OTHER PUBLICATIONS

Google search Results (keywords: Spoiler, Alert, event, online, user) Retireved from Google Patents on Apr. 18, 2018. p. 1-2.*
(Continued)

*Primary Examiner* — Anthony Mejia
*Assistant Examiner* — Joseph M Cousins

(57) ABSTRACT

Technologies are generally described for a spoiler alert scheme. In some examples, a spoiler alert system may include an event determination unit configured to determine an event of interest to a user for which a spoiler alert is to be provided, a spoiler identification unit configured to identify one or more posts in an online forum that include spoiler information regarding the determined event of interest, and a spoiler control unit configured to hide the one or more identified posts from the online forum, as displayed to the user.

6 Claims, 5 Drawing Sheets

(58) Field of Classification Search
CPC ........... G06Q 10/1095; G06Q 30/0252; G06Q 30/0269; G06Q 50/01; G06Q 30/0245; G06Q 30/0631; H04N 21/4542; H04N 21/4334; H04N 21/4882; H04N 21/8133; H04N 21/4622; H04N 21/84; H04N 21/47214; H04N 21/4788; H04N 2005/44569; H04N 21/4307; H04N 21/4316; H04N 21/4781; G06F 17/30041; G06F 3/0485; G06F 17/218
USPC ....... 709/203, 206, 219, 204, 205, 217, 248; 705/14.5, 14.61, 7.18; 725/58
See application file for complete search history.

(56) References Cited

U.S. PATENT DOCUMENTS

| | | | | |
|---|---|---|---|---|
| 8,745,057 | B1* | 6/2014 | Li | G06F 17/30247 707/737 |
| 8,874,672 | B2* | 10/2014 | Ben-Yoseph | 709/206 |
| 8,943,529 | B2* | 1/2015 | Kardatzke | H04N 21/4334 725/116 |
| 2002/0172116 | A1* | 11/2002 | Aprea | G11B 20/00086 369/53.21 |
| 2007/0157237 | A1* | 7/2007 | Cordray | H04H 60/65 725/42 |
| 2008/0040427 | A1* | 2/2008 | Shroff et al. | 709/204 |
| 2009/0307212 | A1* | 12/2009 | Ramot | G06Q 10/109 |
| 2010/0057682 | A1* | 3/2010 | Ramsay et al. | 707/3 |
| 2010/0131443 | A1* | 5/2010 | Agarwal | G06F 17/30867 706/46 |
| 2010/0180001 | A1* | 7/2010 | Hardt | 709/207 |
| 2011/0010774 | A1* | 1/2011 | Park | G11B 27/11 726/24 |
| 2012/0016875 | A1* | 1/2012 | Jin | G06F 17/30867 707/734 |
| 2012/0036423 | A1* | 2/2012 | Haynes et al. | 715/230 |
| 2012/0079067 | A1* | 3/2012 | Stout et al. | G06F 15/16 709/217 |
| 2012/0079517 | A1 | 3/2012 | Yarvis et al. | |
| 2012/0321275 | A1 | 12/2012 | Sly et al. | |
| 2013/0145282 | A1* | 6/2013 | Zhao | 715/751 |
| 2013/0275519 | A1* | 10/2013 | Nichols | G06Q 10/107 709/206 |
| 2013/0293363 | A1* | 11/2013 | Plymouth et al. | G08B 1/00 340/309.16 |
| 2013/0294755 | A1* | 11/2013 | Arme et al. | 386/344 |
| 2014/0101244 | A1* | 4/2014 | Klein | G06Q 10/00 709/204 |
| 2014/0129625 | A1* | 5/2014 | Haugen | H04W 4/08 709/204 |

OTHER PUBLICATIONS

International Search Report from International Application No. PCT/US2013/023454 dated Apr. 15, 2013.
"How to Block Facebook and Other Social Networks from Tracking You Online" N. Messieh, Aug. 28, 2012, 5 pages.
"How to Manage Facebook's News Feed and Live Feed", 2 pages, Mar. 2010.
"Use Gmail Filters to Prevent Social Networking Sites from Clogging Your Inbox", Sep. 11, 2009, 3 pages.
"Olympics Begone! Browser Extension Blocks Some Spoilers" by A. Pittman, 2012, 6 pages.
How to Avoid Spoilers on Twitter (http://gizmodo.com/5927427/how-to-avoid-spoilers-on-twitter), 2012, 6 pages.

* cited by examiner

SPOILER ALERT SCHEME

CROSS-REFERENCE TO RELATED APPLICATION

This Application is the U.S. National Stage filing under 35 U.S.C. § 371 of International Application No. PCT/US13/23454, filed on Jan. 28, 2013. The disclosure of International Application No. PCT/US13/23454 is hereby incorporated herein by reference in its entirety.

BACKGROUND

Social networking services (e.g., Facebook® and Twitter®) and blog services are widely used worldwide. Via such social networking services and/or blog services, users freely post descriptions of their online activity, their ideas and/or opinions, images and/or videos, news, and/or any other digital content that they want to share with others. As information sharing via social networking services and/or blog services becomes popular, it becomes highly possible for the users to be exposed to unwanted information.

SUMMARY

In an example, a spoiler alert system may include an event determination unit configured to determine an event of interest to a user for which a spoiler alert is to be provided, a spoiler identification unit configured to identify one or more posts in an online forum that include spoiler information regarding the determined event of interest, and a spoiler control unit configured to hide the one or more identified posts from the online forum, as displayed to the user.

In another example, a method performed under control of a spoiler alert system may include determining an event of interest to a user, determining whether to provide a spoiler alert for the event of interest, identifying a post in an online forum that includes spoiler information regarding the event of interest, and hiding the identified post from a display of the online forum accessible by the user.

In yet another example, a computer-readable storage medium may store thereon computer-executable instructions that, in response to execution, cause a processor to perform operations, including determining that a post in an online forum includes unwanted preview information regarding an event of interest to a user, and hiding the post from a display of the online forum that is accessible by the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
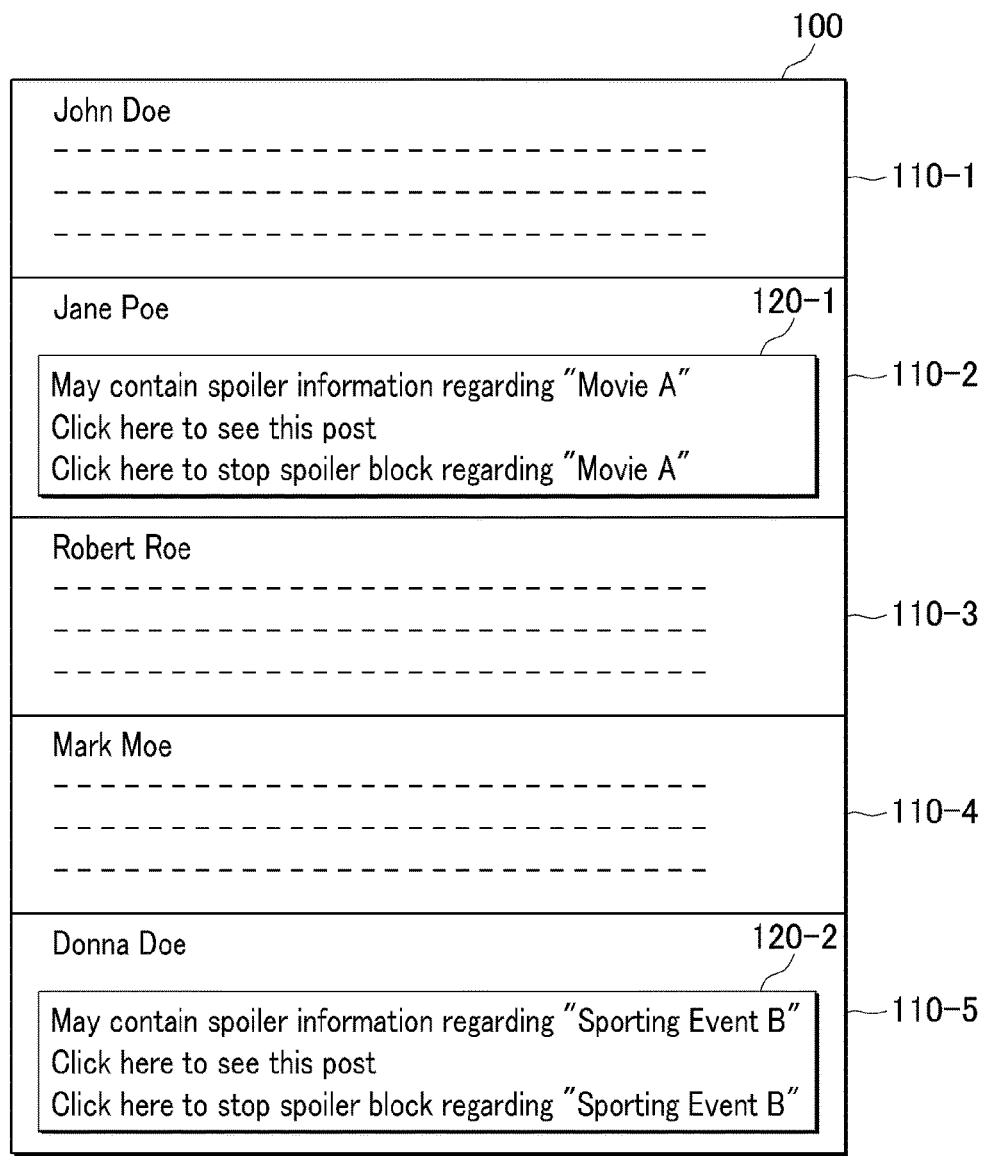
FIG. 1 schematically shows an illustrative example of an online forum, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a spoiler alert scheme in an online forum, such as, for example, social networking sites (e.g., Facebook®, Twitter®, etc.), blogs, news article sites, and so on. Further, technologies are herein generally described for hiding one or more posts that include spoiler information (i.e., unwanted preview information) regarding an event of interest to a user from the online forum, as displayed to the user.

In some examples, a spoiler alert system may determine an event of interest to a user for which a spoiler alert is to be provided, identify one or more posts in an online forum that include spoiler information regarding the determined event of interest, and hide the one or more identified posts from the online forum, as displayed to the user. The spoiler alert system may be operated or controlled by a server or provider of the online forum or an application associated with the online forum and hosted on a client device (e.g., a smartphone, a mobile phone, a personal digital assistant (PDA), a tablet, a laptop computer, a desktop computer, etc.). Examples of the event of interest may include, but are not limited to, a screening of a movie, a broadcast of a television show, a sporting event, etc. The spoiler information regarding the event of interest may include a preview of an outcome of the event of interest that may or may not be desired by the user (e.g., the ending of the movie or the television show, score of the sporting event, a discussion related to any of such topics, etc.).

In some examples, the spoiler alert system may determine the event of interest based at least in part on past online activity by the user in, at least, the online forum. By way of example, but not limitation, when the user is interested in movie A, the user may post in the online forum, or in another online forum, his/her anticipation or expectations regarding movie A (e.g., the user may post "I am so excited to see movie A," or "I already bought an advance ticket for movie A," etc.); express his/her consent, interest and/or agreement with posts regarding movie A (e.g., "like" the posts in Facebook®, "retweet" the posts in Twitter®, etc.); read and/or subscribe news articles regarding movie A; subscribe a website regarding movie A; arrange his/her schedule to watch movie A via a scheduler application; purchase a ticket for movie A via a ticketing application, and so on. In such cases, the spoiler alert system may determine that movie A is an event of interest to the user, based at least in part on such online activity by the user.

Then, in some examples, the spoiler alert system may determine whether to provide the spoiler alert for the determined event of interest, based at least in part on properties of the determined event of interest such as, for example, a date/time at which the event of interest is to occur and/or whether the event of interest is a public event. By way of example, but not limitation, if the determined event of interest is movie A, the spoiler alert system may determine not to provide the spoiler alert for movie A if the movie premiered at least certain number of years prior, while the spoiler alert system may determine to provide the spoiler alert for movie A if it is a new movie to premiere in near future (e.g., in a week, in a month, etc.) or if it premiered recently, within a predetermined threshold amount of time (e.g., a week ago, a month ago, etc.). In accordance with another example, if the determined event of interest is a birthday party of a friend of the user, the spoiler alert system may determine not to provide the spoiler alert for the birthday party, since the birthday party is not a public event. In some alternative examples, the spoiler alert system may determine to provide the spoiler alert for the event of interest for which the user requested the spoiler alert.

Further, in some examples, the spoiler alert system may identify one or more posts in the online forum that include spoiler information regarding the determined event of interest, based at least in part on context of the one or more posts, originators of the one or more posts, spoiler tags associated with the one or more posts, and so on. By way of example, but not limitation, the identified spoiler information regarding movie A, according to the spoiler alert system, may include a title of movie A, names of characters in movie A, names of actors in movie A, and/or any keywords associated with movie A. By way of another example, but not limitation, the identified spoiler information regarding movie A, according to the spoiler alert system, may include one or more posts submitted by a film company of movie A to the online forum. By way of yet another example, but not limitation, the spoiler information regarding movie A, according to the spoiler alert system, may include one or more posts that are identified as being tagged or reported by other users.

In some examples, the spoiler alert system may hide the identified posts that are time-stamped or otherwise marked as being posted after the event of interest has occurred. By way of example, but not limitation, the spoiler alert system may hide the identified posts regarding movie A posted after a release date of movie A, or after a predetermined amount of time has passed after the release date, but not hide the identified posts posted before the release date.

In some examples, the spoiler alert system may display the one or more hidden posts under one or more predetermined conditions. By way of example, but not limitation, the spoiler alert system may display the one or more hidden posts regarding movie A if the user requests that the hidden posts regarding movie A be displayed. By way of another example, but not limitation, the spoiler alert system may display the one or more hidden posts regarding movie A if it has been determined that the user has already seen movie A, or if it has been determined that the user is no longer interested in movie A. By way of yet another example, but not limitation, the spoiler alert system may display the one or more hidden posts when a predetermined time limit expires.

FIG. 1 schematically shows an illustrative example of an online forum 100, arranged in accordance with at least some embodiments described herein.

As depicted, online forum 100 may present to a user multiple posts 110-1, 110-2, 110-3, 110-4 and 110-5, which were posted or submitted by the user and/or other users or entities. Examples of online forum 100 may include, but are not limited to, social networking sites, blogs, news article sites, etc. In some embodiments, a spoiler alert system associated with online forum 100 may control how to present multiple posts 110-1, 110-2, 110-3, 110-4 and 110-5 to the user. By way of example, but not limitation, the spoiler alert system may cooperate with a server or provider of online forum 100 or an application hosted on a device of the user, so that it may hide at least some of posts 110-1, 110-2, 110-3, 110-4 and 110-5 from a display of online forum 100 that is accessible by the user. The spoiler alert system may access the server of online forum 100 and/or servers of other online forums, online scheduler services, and/or online ticketing services, etc., and/or applications hosted on the user's device and associated with online forum 100, other online forums, online scheduler services, and/or online ticketing services, etc., to analyze online activity by the user in at least online forum 100, and implement the spoiler alert scheme. For example, the spoiler alert system may have the authority, granted by the user, to access the user's account on respective ones of the servers of online forum 100, other online forums, online scheduler services, and/or online ticketing services, etc. to collect relevant information regarding online activity by the user in at least online forum 100.

In some embodiments, the spoiler alert system may determine an event of interest to the user based at least in part on the online activity by the user in, at least, online forum 100. That is, the spoiler alert system may analyze the user's activity in online forum 100 and/or other online forums, to thereby determine the event of interest to the user based at least in part on results of the analysis. By way of example, but not limitation, the spoiler alert system may determine the event of interest based at least in part on content analysis of posts of the user in online forum 100 and/or other online forums. For example, when the user posts in online forum 100 and/or other online forums his/her anticipation or expectations regarding movie A, sporting event B, and/or a friend's birthday party C; expresses his/her consent, interest and/or agreement with posts regarding movie A, sporting event B, and/or birthday party C; reads and/or subscribes news articles regarding movie A and/or sporting event B; subscribes a website regarding movie A and/or sporting event B; schedules a date and/or time to watch movie A, watch sporting event B, and/or attend birthday party C via a scheduler application; and/or purchases a ticket for movie A and/or sporting event B via a ticketing application, etc., the spoiler alert system may determine that the user is interested in movie A, sporting event B, and birthday party C, due to the high occurrence of activity regarding such events in online forum 100 and/or other online forums.

In some embodiments, the spoiler alert system may determine whether to provide a spoiler alert for the determined event of interest, based at least in part on at least one property of the determined event of interest. Examples of at least one property of the event of interest may include a scheduled date and/or time for the event of interest (e.g., whether the event of interest is to occur in near future or if the event of interest has already occurred recently) and/or whether the event of interest is a public event. For example, in the case of movie A, the spoiler alert system may determine not to provide the spoiler alert for movie A when movie A is determined to be an old movie that premiered at least a predetermined number of years prior, while the spoiler alert system may determine to provide the spoiler alert for movie A when movie A is scheduled to premiere within a predetermined amount of time (e.g., days, weeks, and/or months) or if movie A has recently premiered within a predetermined time frame. In the case of sporting event B, the spoiler alert system may determine not to provide the spoiler alert for sporting event B when the event occurred a predetermined amount of time prior (e.g., days, weeks, months, and/or years), while the spoiler alert system may determine to provide the spoiler alert for sporting event B when sporting event B is scheduled to take place within a predetermined amount of time (e.g., days, weeks, and/or months) or if sporting event B has recently occurred within a predetermined time frame. In the case of birthday party C, the spoiler alert system may determine not to provide the spoiler alert for birthday party C, since it is not a public event, but a private event.

In some example embodiments, the spoiler alert system may ask for a confirmation of the user as to whether or not to provide the spoiler alert for the determined event of interest. For example, the spoiler alert system may ask the user whether he/she actually wants to not be informed of the ending of movie A and/or the outcome of sporting event B.

In some example embodiments, the spoiler alert system may determine whether to provide the spoiler alert based on a request made by the user.

In some example embodiments, the spoiler alert system may identify at least some of posts 110-1, 110-2, 110-3, 110-4 and 110-5 that include spoiler information regarding the determined event of interest. By way of example, but not limitation, the spoiler alert system may identify at least some of posts 110-1, 110-2, 110-3, 110-4 and 110-5 that include at least one keyword associated with the event of interest, that is submitted by a representative associated with the event of interest, and/or that is tagged as a spoiler. For example, in the case of movie A, the spoiler alert system may identify at least some of posts 110-1, 110-2, 110-3, 110-4 and 110-5 that include the title of movie A, names of characters in movie A, actors in movie A, and/or any keywords associated with movie A; one or more of posts 110-1, 110-2, 110-3, 110-4 and 110-5 that are submitted by a film studio that is releasing movie A; and/or one or more of posts 110-1, 110-2, 110-3, 110-4 and 110-5 that are tagged as a spoiler regarding movie A. In the case of sporting event B, the spoiler alert system may identify at least some of posts 110-1, 110-2, 110-3, 110-4 and 110-5 that include names and/or nicknames of teams and/or athletes associated with sporting event B, a name of stadium or arena where sporting event B is to be held, and/or any keywords associated with sporting event B; that is submitted by the teams and/or athletes associated with sporting event B; and/or that is tagged as a spoiler regarding sporting event B.

In accordance with some example embodiments, when online forum 100 determines that, e.g., posts 110-2 and 110-5, among posts 110-1, 110-2, 110-3, 110-4 and 110-5, include spoiler information regarding an event of interest to the user, the spoiler alert system may determine to not display posts 110-2 and 110-5 to the user. In such cases, the spoiler alert system may provide the user with the spoiler alert for posts 110-2 and 110-5. For example, the spoiler alert system may have online forum 100 or the application associated with online forum 100 display alert boxes 120-1 and 120-2 respectively for posts 110-2 and 110-5, which may overlap, distort, or otherwise hide posts 110-2 and 110-5, as well as display a message to the user indicating that the hidden posts may contain spoiler information. In some example embodiments, alert boxes 120-1 and 120-2 may also ask the user whether the hidden post should remain hidden or should be displayed, and/or whether subsequent posts regarding the corresponding event of interest should be blocked.

Further to the embodiment described above, in some example embodiments, the spoiler alert system may hide, from the display of online forum 100, posts 110-2 and 110-5 posted after the event of interest has occurred. For example, the spoiler alert system may hide, from the display of online forum 100, posts 110-2 and 110-5 that are posted after movie A has premiered or after sporting event B has ended, for at least a predetermined amount of time.

Still further to the embodiment described above, in some example embodiments, the spoiler alert system may have online forum 100 or the application associated with online forum 100 display posts 110-2 and 110-5 under one or more predetermined conditions. The one or more predetermined conditions may be associated a request made by the user, online activity by the user, and/or a predetermined time limit. By way of example, but not limitation, when the user requests, via alert boxes 120-1 and/or 120-2, to see the corresponding hidden post or to stop spoiler alerts regarding the corresponding event of interest, the spoiler alert system may have online forum 100 or the application associated with online forum 100 display posts 110-2 and 110-5. By way of another example, but not limitation, when online forum 100 determines that the user is no longer interested in the event of interest based on the user's online activity, the spoiler alert system may have online forum 100 or the application associated with online forum 100 display at least a corresponding one of posts 110-2 and 110-5. By way of yet another example, but not limitation, the spoiler alert system may determine respective time limits for hiding posts 110-2 and 110-5, and subsequently display posts 110-2 and 110-5 when the respective time limits expire. Each of the time limits may be a constant value, or vary depending on degree of interest for the corresponding event of interest (e.g., how many times the user posted regarding the event of interest in at least online forum 100, how many articles the user read regarding the event of interest, etc.).

Figure 2:
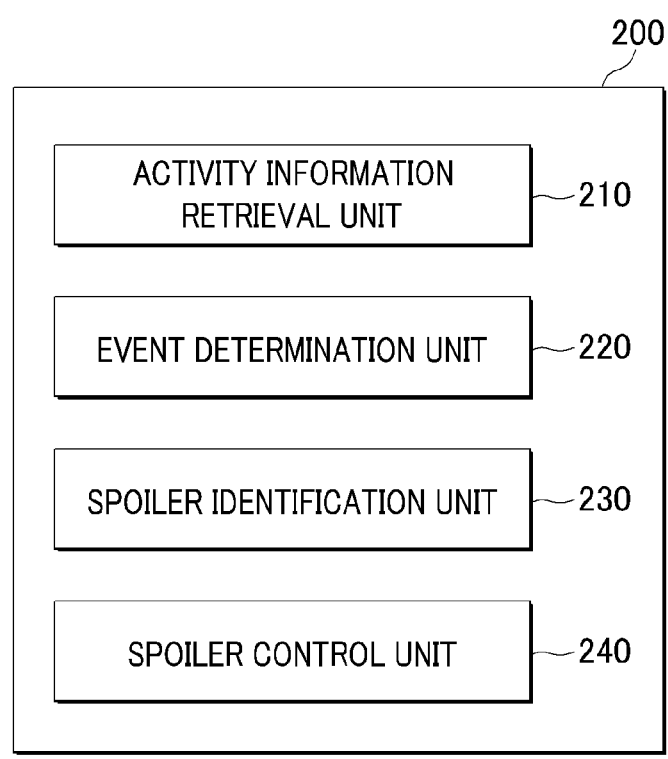
FIG. 2 shows a schematic block diagram illustrating an example architecture of a spoiler alert system for implementing a spoiler alert scheme, arranged in accordance with at least some embodiments described herein.

FIG. 2 shows a schematic block diagram illustrating an example architecture of a spoiler alert system 200 for implementing a spoiler alert scheme, arranged in accordance with at least some embodiments described herein.

In some embodiments, spoiler alert system 200 may be operated or controlled by a server or provider of online forum 100 as shown in FIG. 1, or an application hosted on a device of the user. Spoiler alert system 200 may access the server of online forum 100 and/or servers of other online forums, online scheduler services, and/or online ticketing services, etc., and/or applications hosted on the user's device and associated with online forum 100, other online forums, online scheduler services, and/or online ticketing services, etc., to analyze online activity by the user and implement the spoiler alert scheme. For example, spoiler alert system 200 may have the authority, granted by the user, to access the user's account on respective ones of the servers of online forum 100, other online forums, online scheduler services, and/or online ticketing services, etc. to collect relevant information regarding online activity by the user in at least online forum 100.

As depicted in FIG. 2, spoiler alert system 200 may include an activity information retrieval unit 210, an event determination unit 220, a spoiler identification unit 230 and a spoiler control unit 240. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of activity information retrieval unit 210, event determination unit 220, spoiler identification unit 230 and spoiler control unit 240 may be included in the server of online forum 100 and/or an instance of the application hosted on the user's device.

Activity information retrieval unit 210 may be configured to retrieve the relevant information regarding online activity by the user in at least online forum 100. By way of example, but not limitation, activity information retrieval unit 210 may be configured to access the server of, at least, online forum 100 to retrieve the relevant information regarding online activity by the user. By way of another example, but not limitation, activity information retrieval unit 210 may be configured to the applications associated with, at least, online forum 100 and hosted on the user's device to retrieve the relevant information regarding online activity by the user.

Event determination unit 220 may be configured to determine an event of interest to a user for which one or more spoiler alerts are to be provided. In some embodiments, event determination unit 220 may be further configured to determine the event of interest based at least in part on the online activity by the user retrieved by activity information retrieval unit 210. By way of example, but not limitation, event determination unit 220 may be configured to determine the event of interest based at least in part on content analysis of posts of the user in at least online forum 100, which may be retrieved by activity information retrieval unit 210.

In some embodiments, event determination unit 220 may be further configured to determine whether to provide the spoiler alert based at least in part on at least one property of the determined event of interest. The at least one property of the event of interest may include, but is not limited to, a date/time at which the event of interest is to occur and/or whether the event of interest is a public event. In some other embodiments, event determination unit 220 may be configured to determine whether to provide the spoiler alert for the determined event of interest based at least in part on a request made by the user.

Spoiler identification unit 230 may be configured to identify one or more posts in online forum 100 that include spoiler information regarding the event of interest determined by event determination unit 220. In some embodiments, the identified one or more posts may include at least one keyword associated with the determined event of interest. In some other embodiments, the identified one or more posts may be posted by a representative associated with the event of interest. In yet some other embodiments, the identified one or more posts may be reported as being a spoiler.

Spoiler control unit 240 may be configured to blur, or obfuscate, or hide the one or more posts identified by spoiler identification unit 230 from a display of online forum 100 that is accessible by the user. By way of example, but not limitation, spoiler control unit 240 may provide the user with alert boxes 120-1 and 120-2 for overlapping or otherwise hiding posts 110-2 and 110-5, as illustrated in FIG. 1. In some embodiments, spoiler control unit 240 may be further configured to provide the user with the spoiler alert for the one or more posts determined by spoiler identification unit 230.

In some embodiments, spoiler control unit 240 may be further configured to display the one or more identified posts under a predetermined condition. The predetermined condition may be associated with at least one of a request made by the user, activity by the user in at least the online forum, or a predetermined time limit. In some embodiments, spoiler control unit 240 may provide the user with a list of other hidden posts when displaying the one or more identified posts.

Figure 3:
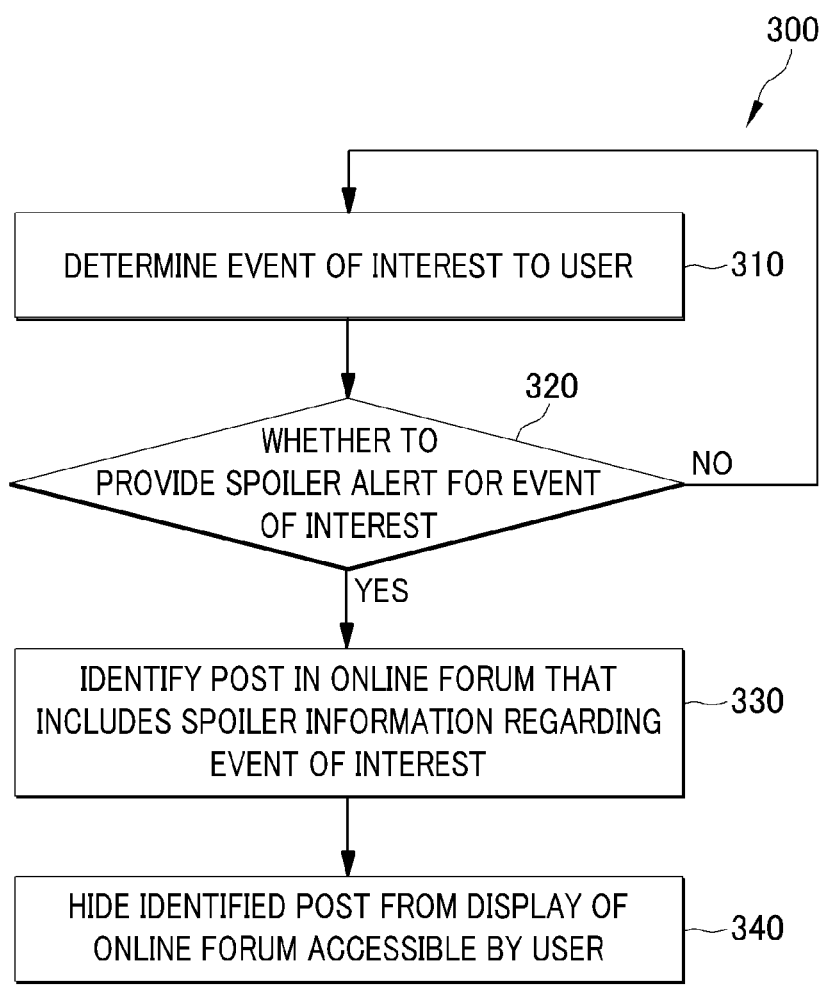
FIG. 3 shows an example flow diagram of a process for a spoiler alert system implementing a spoiler alert scheme, arranged in accordance with at least some embodiments described herein.

FIG. 3 shows an example flow diagram of a process 300 for a spoiler alert system implementing a spoiler alert scheme, arranged in accordance with at least some embodiments described herein.

Process 300 may be implemented in a spoiler alert system such as spoiler alert system 200 including activity information retrieval unit 210, event determination unit 220, spoiler identification unit 230 and spoiler control unit 240. Process 300 may include one or more operations, actions, or functions as illustrated by one or more blocks 310, 320, 330 and/or 340. Although illustrated as discrete blocks, various blocks may be divided into additional blocks, combined into fewer blocks, or eliminated, depending on the desired implementation. Processing may begin at block 310.

At block 310 (Determine Event of Interest to User), spoiler alert system 200 (e.g., event determination unit 220) may determine an event of interest to a user. In some embodiments, spoiler alert system 200 may determine the event of interest based on online activity by the user, e.g., by content analysis of posts submitted by the user to at least online forum 100. Processing may continue from block 310 to decision block 320.

At decision block 320 (Whether to Provide Spoiler Alert for Event of Interest), spoiler alert system 200 (e.g., event determination unit 220) may determine whether to provide a spoiler alert for the event of interest. In some embodiments, spoiler alert system 200 may determine whether to provide the spoiler alert based on at least one property of the event of interest, such as a date/time at which the event of interest is to occur and/or whether the event of interest is a public event, etc. In some other embodiments, spoiler alert system 200 may determine whether to provide the spoiler alert based on a request made by the user. When it is determined that at least one spoiler alert for the event of interest is to be provided, processing may continue from decision block 320 to block decision 330. Otherwise, processing may continue from decision block 320 to block 310.

At block 330 (Identify Post in Online Forum that Includes Spoiler Information Regarding Event of Interest), spoiler alert system 200 (e.g., spoiler identification unit 230) may identify a post in online forum 100 that includes spoiler information regarding the event of interest. In some embodiments, spoiler alert system 200 may identify at least one keyword associated with the event of interest in the post. In some other embodiments, spoiler alert system 200 may identify an originator of the post to be a representative associated with the event of interest. In yet some other embodiments, spoiler alert system 200 may identify a spoiler tag associated with the post. Processing may continue from block 330 to block 340.

At block 340 (Hide Identified Post from Display of Online Forum Accessible by User), spoiler alert system 200 (e.g., spoiler control unit 240) may hide, blur, or obfuscate, from a display of online forum 100 accessible by the user, the identified post. In some embodiments, spoiler alert system 200 may also provide the spoiler alert for the identified and hidden post.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
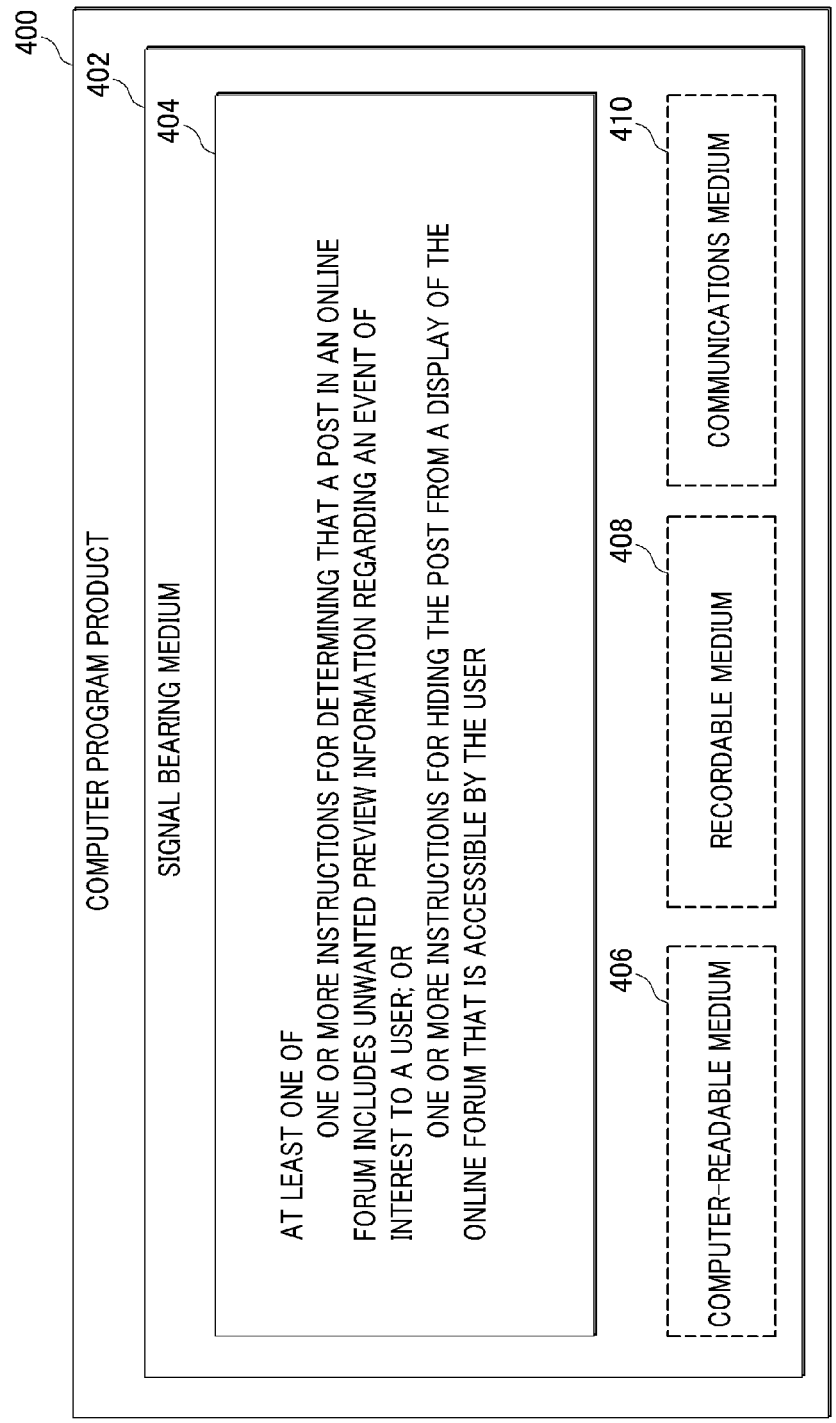
FIG. 4 illustrates an example computer program product that may be utilized to implement a spoiler alert scheme, arranged in accordance with at least some embodiments described herein.

FIG. 4 illustrates an example computer program product 400 that may be utilized to implement a spoiler alert scheme, arranged in accordance with at least some embodiments described herein.

Program product 400 may include a signal bearing medium 402. Signal bearing medium 402 may include one or more instructions 404 that, when executed by, for example, a processor, may provide the functionality described above with respect to FIGS. 1-3. By way of example, instructions 404 may include: one or more instructions for determining that a post in an online forum includes unwanted preview information regarding an event of interest to a user; or one or more instructions for hiding the post from a display of the online forum that is accessible by the user. Thus, for example, referring to FIG. 2, spoiler alert system 200 may undertake one or more of the blocks shown in FIG. 3 in response to instructions 404.

In some implementations, signal bearing medium 402 may encompass a computer-readable medium 406, such as, but not limited to, a hard disk drive, a CD, a DVD, a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, program product 400 may be conveyed to one or more modules of spoiler alert system 200 by an RF signal bearing medium 402, where the signal bearing medium 402 is conveyed by a wireless communications medium 410 (e.g., a wireless communications medium conforming with the IEEE 802.11 standard).

Figure 5:
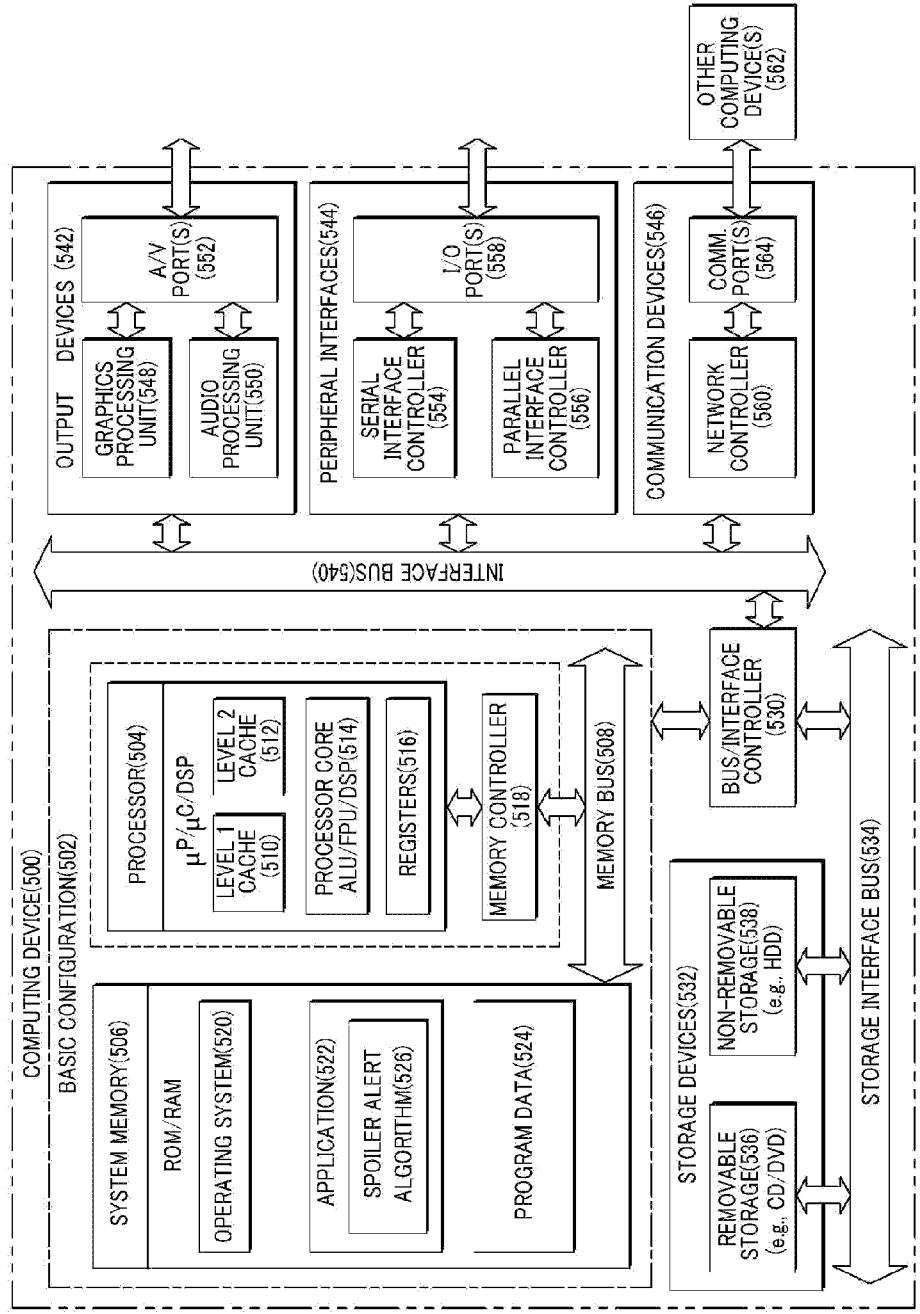
FIG. 5 is a block diagram illustrating an example computing device that may be utilized to implement a spoiler alert scheme, arranged in accordance with at least some embodiments described herein.

FIG. 5 is a block diagram illustrating an example computing device 500 that may be utilized to implement a spoiler alert scheme, arranged in accordance with at least some embodiments described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), nonvolatile memory (such as ROM, flash memory, etc.) or any combination thereof. System memory 506 may include an operating system 520, one or more applications 522, and program data 524. Application 522 may include a spoiler alert algorithm 526 that may be arranged to perform the functions as described herein including the actions described with respect to the spoiler alert system 200 architecture as shown in FIG. 2 or including the actions described with respect to the flow charts shown in FIG. 3. Program data 524 may include any data that may be useful for providing the spoiler alert scheme as is described herein. In some examples, application 522 may be arranged to operate with program data 524 on an operating system 520 such that the spoiler alert scheme as described herein may be provided.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A spoiler alert system, comprising:
 a memory; and
 at least one processor, the memory having stored thereon computer-executable instructions that, in response to execution, cause the at least one processor to perform or control performance of operations, comprising:
  determine an event based at least in part on content analysis of posts of a user in an online forum;
  determine whether to provide a spoiler alert for the event based at least in part on properties of the event, wherein the properties of the event include a time at which the event is to occur and whether the event is a public event;
  provide a spoiler alert for the event after a determination that the event is yet to occur within a first time frame or has already occurred within a second time frame, wherein the first time frame and the second time frame are related to the event based on a determination that the event is a public event, and wherein the operations to provide the spoiler alert:
   identify one or more posts in the online forum that include spoiler information regarding the event; and
   prevent the identified one or more posts in the online forum from being displayed to the user for a time limit, wherein the time limit to prevent the identified one or more posts in the online forum from being displayed to the user varies in duration according to an amount of previous activity, by the user in the online forum, that pertains to the event, wherein the amount of previous activity by the user in the online forum includes a number of times that the user has posted in the online forum regarding the event and a number of articles that the user has read regarding the event; and
   in response to expiration of the time limit, display the identified one or more posts in the online forum to the user.

2. The spoiler alert system of claim 1, wherein the determination whether to provide the spoiler alert is further based on a request made by the user.

3. The spoiler alert system of claim 1, wherein the identified one or more posts include at least one keyword associated with the event.

4. The spoiler alert system of claim 1, wherein the identified one or more posts are posted by a representative associated with the event.

5. The spoiler alert system of claim 1, wherein the identified one or more posts are reported as being a spoiler.

6. A spoiler alert system, comprising:
 a server that comprises at least one processor configured to perform or control performance of:
  determine an event based on content analysis of posts of a user in an at least one online forum;
  determine whether to provide a spoiler alert for the event based at least in part on properties of the event, wherein the properties of the event include a time at which the event is to occur and whether the event is a public event; and
  identify one or more posts, in the at least one online forum, that include spoiler information regarding the event; and
 a communication interface operatively coupled to the server, wherein the interface is configured to:
  in response to a determination that the spoiler alert is to be provided, provide a spoiler alert for the identified one or more posts; and
  provide the user with a list of other hidden posts when the identified one or more posts are displayed on a device associated with the user,
  wherein to control the communication interface to provide the spoiler alert, the server is configured to perform or control performance of:
   prevent the one or more identified posts, in the at least one online forum, from being displayed on the device associated with the user for a time limit, wherein the time limit to prevent the one or more identified posts from being displayed on the device associated with the user varies in duration according to an amount of previous activity, by the user in the at least one online forum, that pertains to the event, wherein the amount of previous activity by the user in the online forum includes a number of times that the user has posted in the online forum regarding the event and a number of articles that the user has read regarding the event; and
   in response to expiration of the time limit, enable display of the identified one or more posts, in the at least one online forum, on the device associated with the user.

* * * * *